United States Patent [19]

Vargas et al.

[11] Patent Number: 5,517,904
[45] Date of Patent: May 21, 1996

[54] FOOD PRODUCT DEPOSITOR

[75] Inventors: Gregory C. Vargas, White Bear Lake; Jimmy A. DeMars, Hugo; Robert F. Meyer, Minneapolis, all of Minn.

[73] Assignee: The Pillsbury Company, Minneapolis, Minn.

[21] Appl. No.: 195,539

[22] Filed: Feb. 14, 1994

[51] Int. Cl.[6] .................................................. A21C 9/04
[52] U.S. Cl. ............................ 99/450.1; 99/489; 99/493; 99/494
[58] Field of Search ............................... 99/450.1, 450.6, 99/450.7, 486, 489, 493, 494

[56] References Cited

U.S. PATENT DOCUMENTS

| | | | |
|---|---|---|---|
| 3,479,970 | 11/1969 | Carbajal | 107/1 |
| 3,676,036 | 7/1972 | Rossi | 99/450.7 |
| 3,868,048 | 2/1975 | Soodalter | 99/450.1 |
| 3,906,850 | 9/1975 | Papai | 99/450.7 |
| 4,112,834 | 9/1978 | Thiry | 99/450.1 |
| 4,197,794 | 4/1980 | Rague et al. | 99/450.1 |
| 4,264,634 | 4/1981 | Hochandel et al. | 426/289 |
| 4,569,101 | 2/1986 | Tribbett | 17/41 |
| 4,569,849 | 2/1986 | Codino | 426/275 |
| 4,685,874 | 8/1987 | Dreisin | 425/132 |
| 4,788,071 | 11/1988 | Hayashi et al. | 426/281 |
| 4,806,087 | 2/1989 | Hayashi | 425/130 |
| 4,928,592 | 5/1990 | Moshier et al. | 99/450.1 |
| 5,012,726 | 5/1991 | Fehr et al. | 99/450.6 |
| 5,073,391 | 12/1991 | DeMars et al. | 426/289 |
| 5,209,156 | 5/1993 | Lombard | 99/450.1 |
| 5,243,899 | 9/1993 | Moshier et al. | 99/450.1 |
| 5,244,370 | 9/1993 | DeMars | 425/72.1 |

FOREIGN PATENT DOCUMENTS

| | | |
|---|---|---|
| 0255350A2 | 2/1988 | European Pat. Off. . |
| 0257717A2 | 3/1988 | European Pat. Off. . |
| 2614831 | 5/1987 | France . |
| 2101926 | 1/1983 | United Kingdom . |

*Primary Examiner*—David Scherbel
*Assistant Examiner*—James F. Hook
*Attorney, Agent, or Firm*—Westman, Champlin & Kelly

[57] ABSTRACT

A food product depositor for depositing a food product on a receptacle carried on a continuously moving conveyor. A first depositing mechanism includes an extrusion head which moves in tandem with the receptacle while extruding food product. A microprocessor is coupled to tandem scales to control operation of the depositor and to determine whether the weight of extruded food product is within a preselected target weight range. The microprocessor permits feedback control of the first depositor to adjust its performance based on factors including temperature, pressure and voids within the food product. The microprocessor actuates a second depositing mechanism if necessary to deposit a second amount of food product on the receptacle to reach the preselected target weight range.

20 Claims, 5 Drawing Sheets

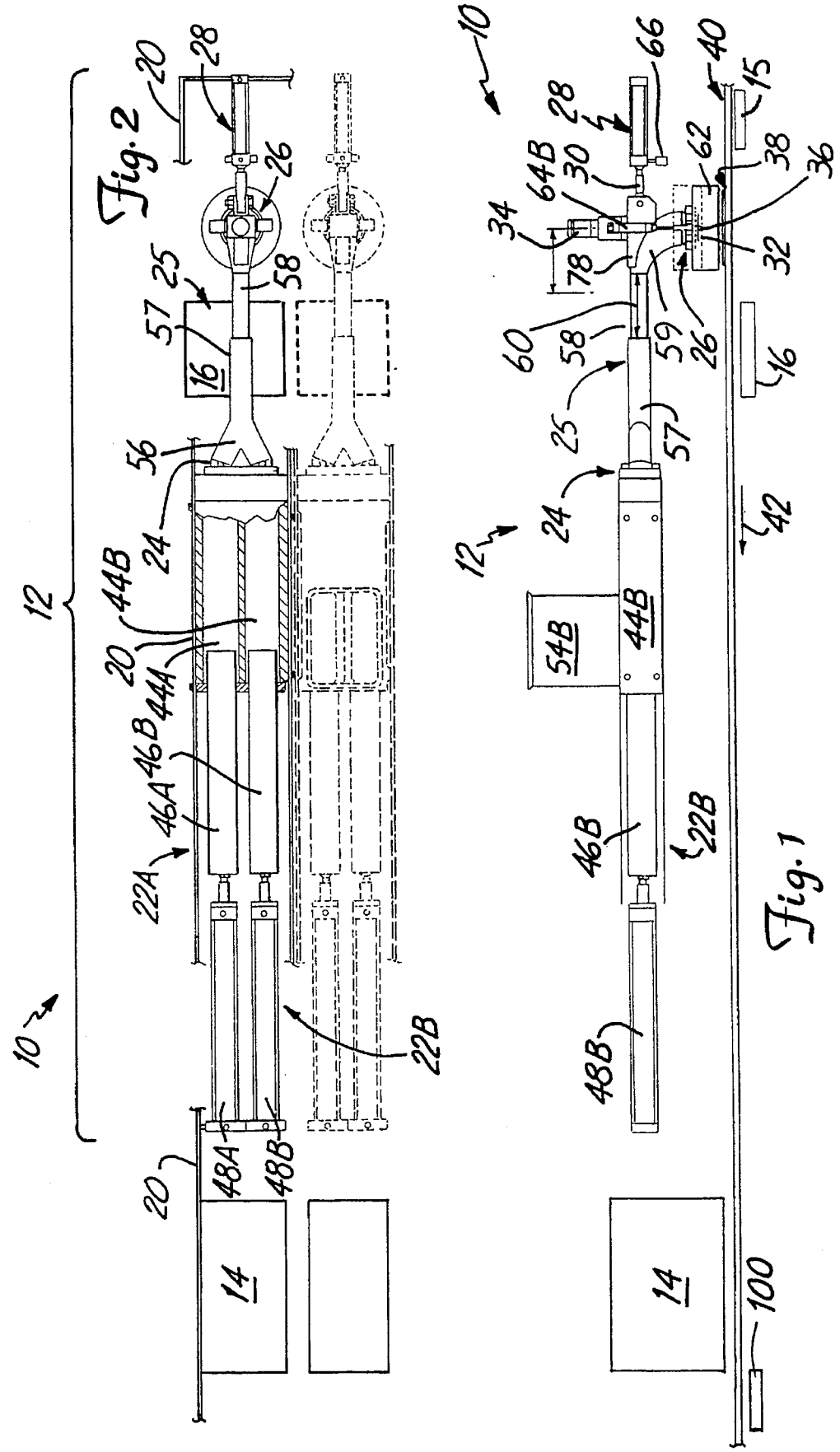

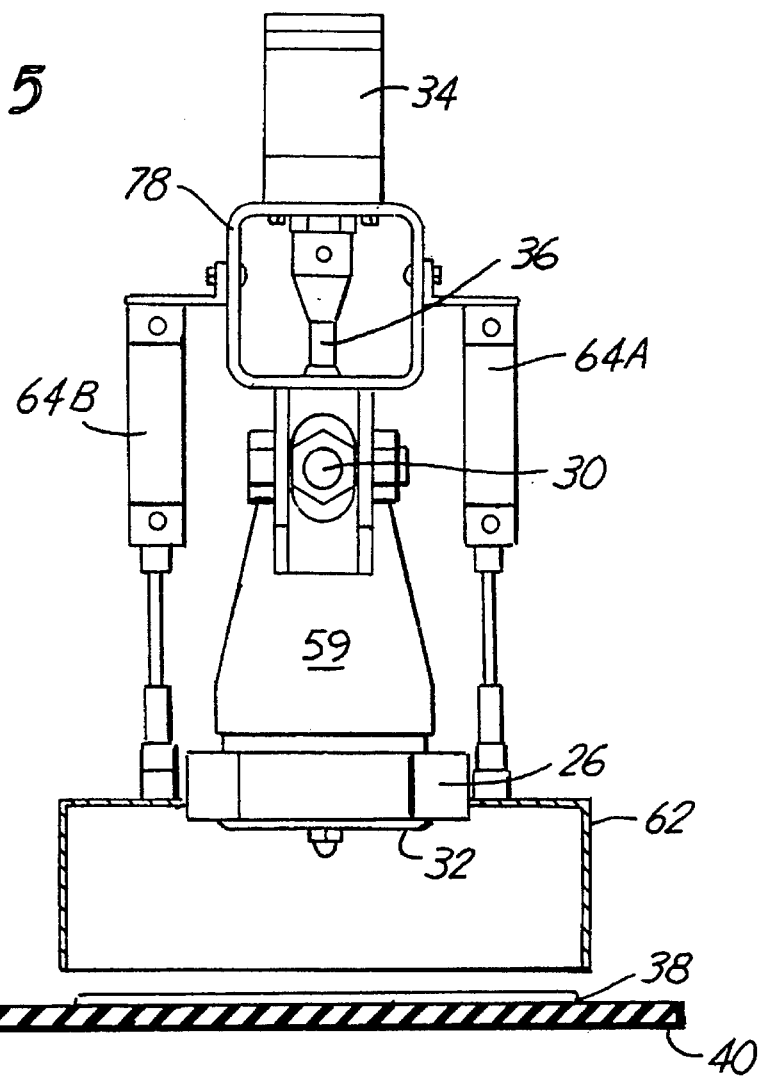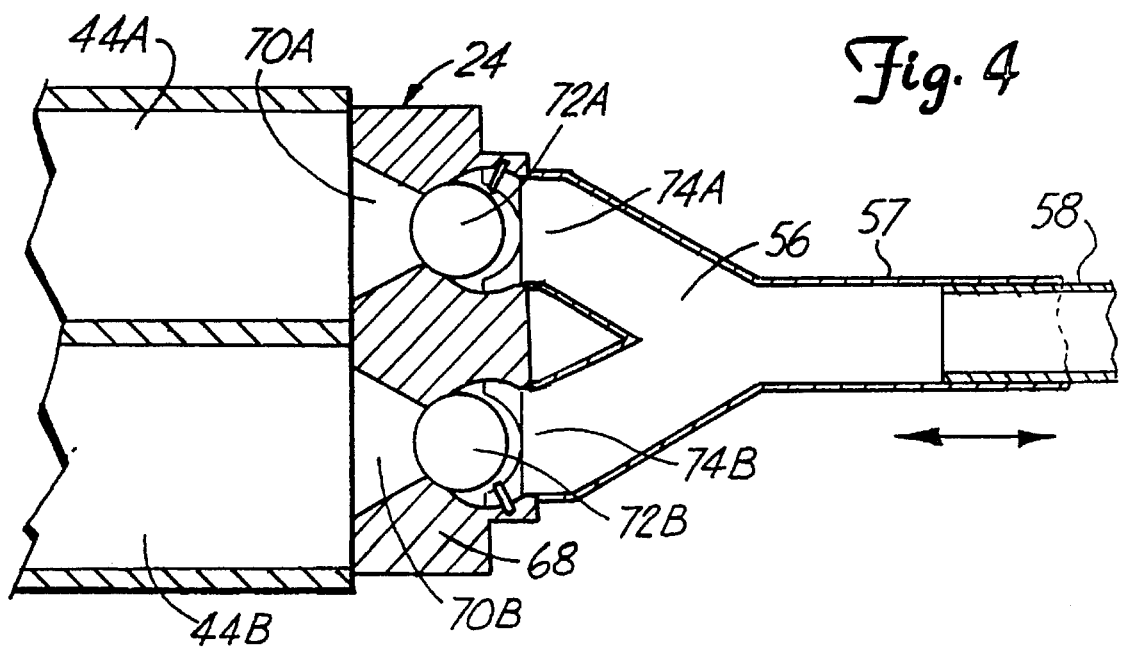

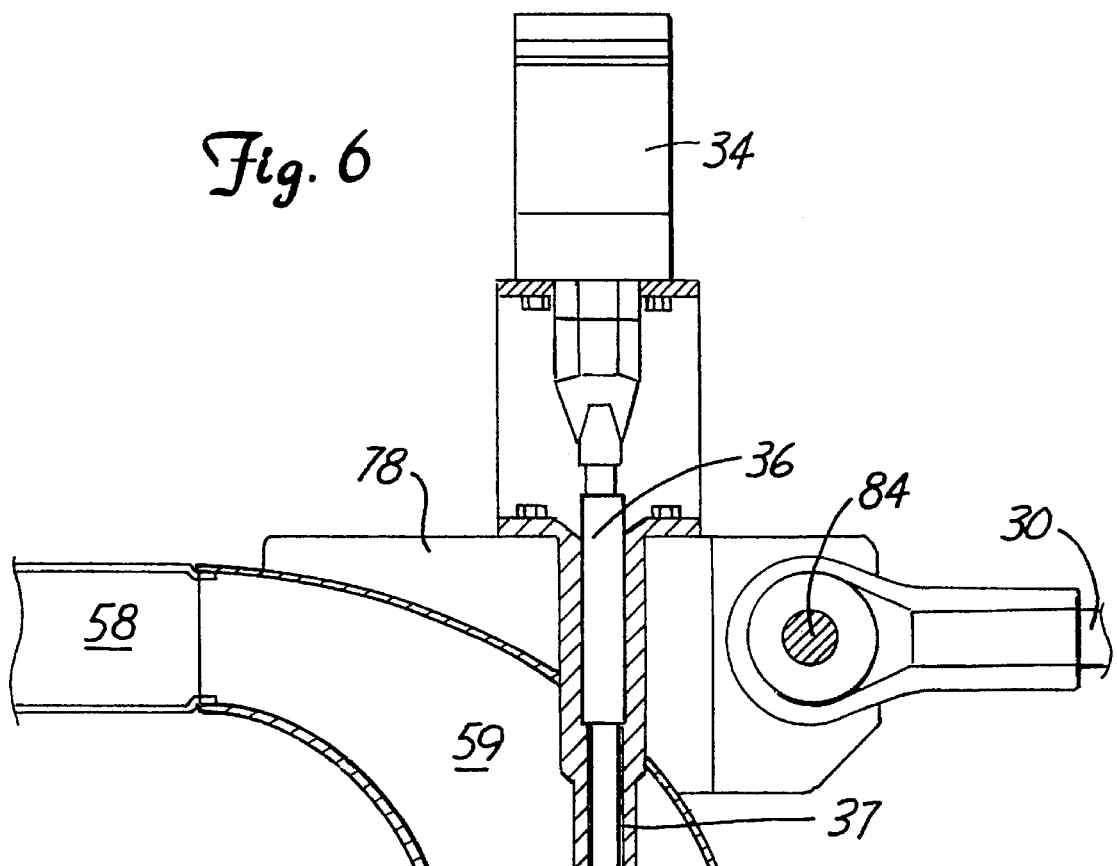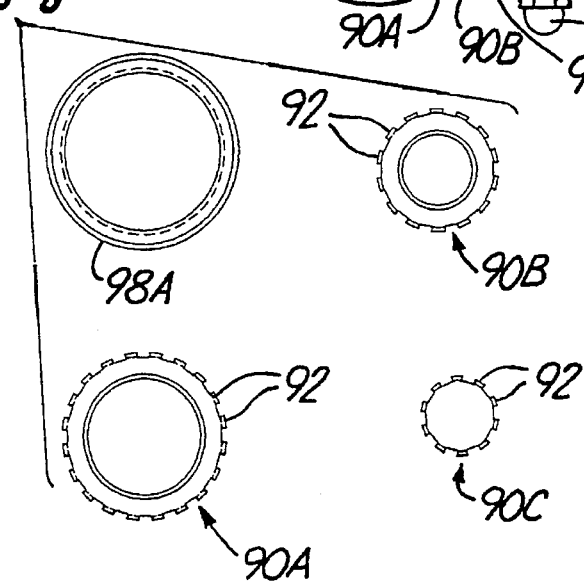

5,517,904

FOOD PRODUCT DEPOSITOR

BACKGROUND OF THE INVENTION

This invention pertains to an apparatus for depositing a food product. In particular, the present invention is an apparatus for depositing a controlled amount of cheese on a pizza crust while continuously moving the pizza crust on a conveyor assembly.

Apparatus for depositing cheese on pizza crust are generally known. U.S. Pat. No. 4,264,634 to Hochandel et al. discloses one such apparatus. The apparatus includes a continuous conveyor on which pizza crusts are transported. Mounted above the continuous conveyor is a grating mechanism and an intermediate conveyor. The intermediate conveyor is a continuous belt supported between the grating mechanism and the continuous conveyor. Weight of cheese on the intermediate conveyor is measured. The grating mechanism is selectively operable to deposit grated cheese onto the intermediate transfer conveyor. As the belt of the intermediate conveyor moves, cheese is deposited on the moving pizza crust.

U.S. Pat. No. 5,073,391 to DeMars et al. discloses a mechanism for depositing a controlled amount of a food product upon a receptacle. The depositing mechanism includes an extrusion device having an exit port. A pressure element forces food product through the exit port onto the receptacle. The receptacle is positioned atop a scale. The scale is linked to a control module which is coupled to the depositing mechanism. The control module controls operation of the depositing mechanism based upon weight information from the scale. The device requires the receptacle to remain stationary beneath the exit port while food product is deposited.

In modern food processing plants, high speed operation can provide a significant advantage in the marketplace by improving efficiency. There is a continuing need for improved mechanisms for depositing a controlled amount of cheese on a pizza crust having greater speed and efficiency.

SUMMARY OF THE INVENTION

One embodiment of the present invention is a first food depositing mechanism for depositing a food product onto a receptacle which is moving in a lateral direction. An extrusion head is coupled to a source of food product and moves in a lateral direction in tandem with the receptacle. The extrusion head is coupled to a first extrusion conduit. The first extrusion conduit is slidably coupled to a second extrusion conduit. The source of food product provides food product to the second extrusion conduit. A drive mechanism moves the extrusion head in the lateral direction while the head deposits extruded food product on the receptacle.

One aspect of the invention includes a second food depositing mechanism spaced laterally apart from the first depositing mechanism with a scale placed therebetween. A controller coupled to the scale controls the first depositing mechanism and the second depositing mechanism to obtain a desired quantity of food product on the receptacle.

BRIEF DESCRIPTION OF THE DRAWINGS

FIG. 1 is a side elevational view of a food depositor in accordance with the present invention.

FIG. 2 is a top elevational view of the food depositor shown in FIG. 1, with a second identical food depositor shown.

FIG. 4 is a top view of a control valve assembly shown in FIG. 1.

FIG. 5 is an end plan view of a portion of the depositing mechanism shown in FIG. 1.

FIG. 6 is a side view of FIG. 5.

FIG. 7 is a broken apart view of an extrusion head.

FIG. 8 is a bottom view of a portion of the extrusion head.

DETAILED DESCRIPTION OF THE PREFERRED EMBODIMENTS

Figure 3:
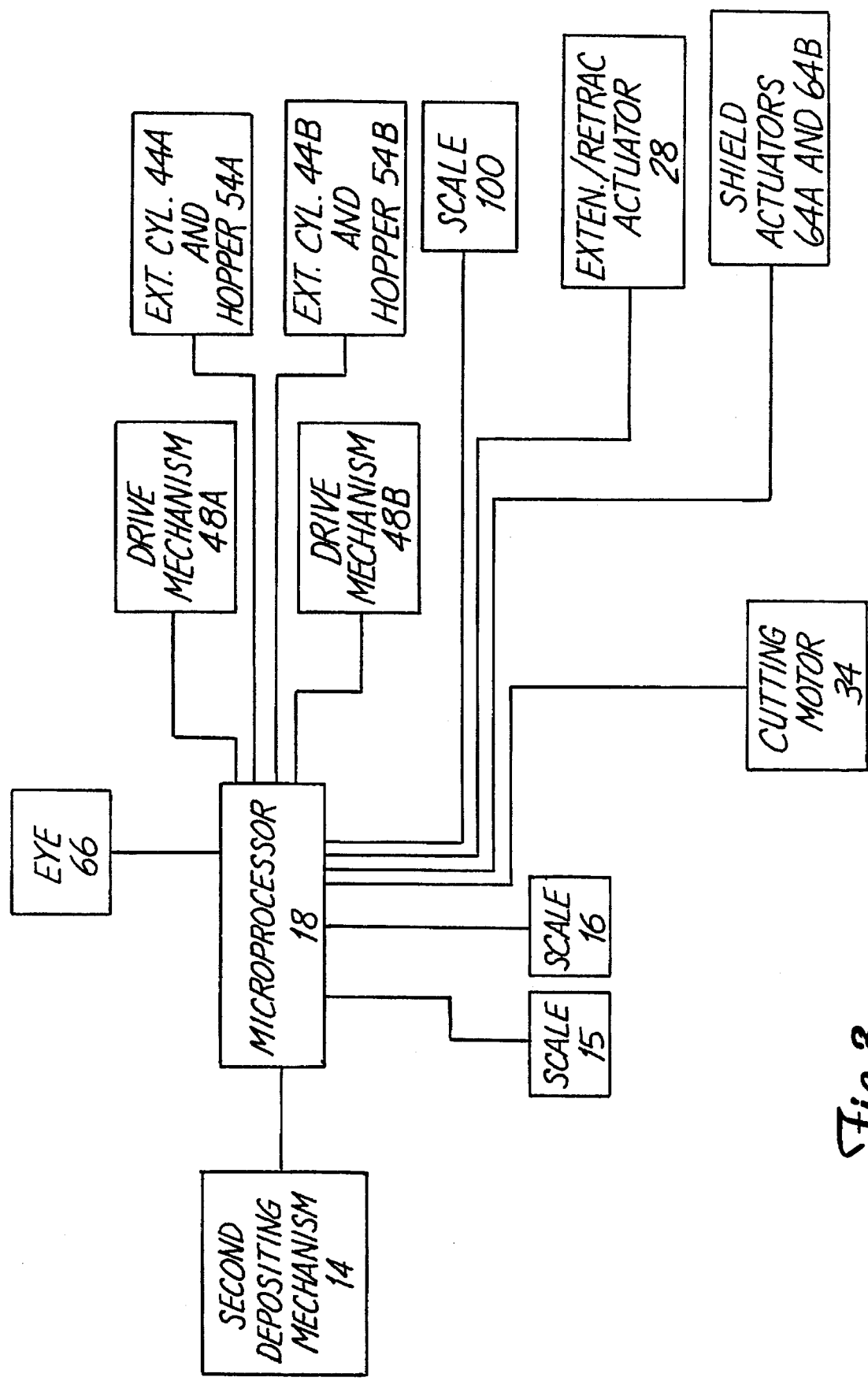
FIG. 3 is a block diagram of the invention shown in FIG. 1.

The disclosed depositing apparatus provides high speed food deposition on a continuously moving receptacle. During deposition, the receptacle does not need to stop to receive food product. Further, the deposited food product is weighed and the information is used by a subsequent food depositing mechanism to reach a predetermined amount of deposited food product.

To facilitate increased operation speed, an extrusion head moves laterally, in tandem with the moving receptacle. Movement of the extrusion head also forces the food product to be extruded from the head in one direction and fills the conduits when moving in the other direction. Multiple food product sources supply food product to the head to further increase system speed.

Although specific embodiments are shown, the concepts set forth are applicable to a wide range of extrudates and extrusion or depositing devices. Extrusion drive sources and conduits can be of any suitable type typically used with extrusion or depositing devices. Further, other depositing devices such as volumetric feeders, including screw feeders and belt feeders, can be used.

A food depositor 10 in accordance with the present invention is shown in FIGS. 1 and 2. Food depositor 10 includes first depositing mechanism 12, second depositing mechanism 14, scale 15 and scale 16. First depositing mechanism 12 includes frame 20, first supply element 22A, second supply element 22B, "Y" coupling 56, extrusion head 26, and extrusion conduit 25. Extension/retraction actuator 28 couples to head 26 with shaft 30. Head 26 couples to cutting blade 32 and cutting motor 34. Cutting blade 32 rotates with shaft 36 such that extruded food product is cut prior to deposition onto receptacle 38. Receptacle 38 is advanced under first depositing mechanism 12 by conveyor assembly 40 which is continuously running in a lateral direction indicated by arrow 42. Conveyor 40 does not stop during the deposition of food product onto receptacle 38.

First supply element 22A includes first compression cylinder 44A and a pressure element such as first piston 46A which is movable within first compression cylinder 44A by way of pressure from first drive mechanism 48A. Piston 46A acts to force a food product (such as cheese fed into first compression cylinder 44A from first hopper 54A) out of cylinder 44A. Supply element 22B is substantially similar to supply element 22A and like elements are similarly numbered.

The extrusion path includes "Y" coupling 56 (having control valve assembly 24), conduit 57, and slidable conduit 58 attached to extrusion head 26 via bend 59. Conduit 58 is slidably inserted into conduit 57. This allows extension/retraction actuator 28 to move extrusion head 26 laterally as shown by arrow 60 such that extrusion head 26 follows receptacle 48 on conveyor assembly 40 during the depositing of food product. The extension of actuator 28 forces food product carried in conduits 57 and 58 through head 26 while simultaneously closing valves in control valve assembly 24 by changing direction of the force applied to the food product. The retraction of actuator 28 causes conduits 57 and 58 to immediately fill with food product from cylinder 44A or 44B (also called "infeed chambers") due to the reduced pressure in conduits 57 and 58 and the travel of actuators 48A and 48B and pistons 46A and 46B. This causes valve assembly 24 to open in the direction of head 26. Elements 22A,22B, valve assembly 24 and "Y" coupling 56 act generally as a food source for head 26 and conduits 57,58.

Shield 62 is connected to shield actuators 64A and 64B (shown in FIG. 5) which are attached to extrusion head 26 such that shield 62 extends downward during deposition and is retracted upward at other times (as shown by the dashed lines in FIG. 1). Shield 62 directs extruded food product onto receptacle 38 and prevents stray food product from being deposited onto conveyor 40.

First depositing mechanism 12 includes photo eye 66 which monitors receptacle 38 on conveyor assembly 40. Eye 66 alerts microprocessor 18 (shown in FIG. 3) that a receptacle has moved into position and is ready for food product deposition. Detection of receptacle 38 by eye 66 sets in motion the process of depositing food products which includes, not necessarily in this order, weighing the receptacle; aligning the depositor head with the receptacle; opening and closing valves in "Y" coupling 56 due to food product flow to allow fluid communication between an extrusion cylinder and conduit 25; extension of shield 62 to cover receptacle 38; activation of drive mechanism 48A or 48B; rotation of cutting blade 32 by cutting motor 34; extension of extension/retraction shaft 30 from extension/retraction cylinder 29 which moves extrusion head 26 in tandem with receptacle 38 whereby cut food product is deposited on receptacle 38 without slowing or stopping conveyor assembly 40. Extension of shaft 30 forces food product to be extruded from head 26.

Food product is caused to enter "Y" coupling 56 by drive mechanism 48A or 48B which drive piston 46A or 46B into compression cylinder 44A or 44B, respectively. Extrusion of food product occurs through "Y" coupling 56, conduits 57 and 58, bend 59, and extrusion head 26.

FIG. 4 is an enlarged sectional view of "Y" coupling 56 including control valve assembly 24. Valve assembly 24 includes control valve housing 68, first and second extrusion cylinder outlets 70A and 70B, and first and second ball check valves 72A and 72B, respectively. Assembly 24 includes first conduit inlet 74A and second conduit inlet 74B. Valves 72A and 72B are independently operable, and each may be opened or closed independent of the other. In a preferred embodiment, when one of the ball check valves is closed, thus allowing the respective extrusion cylinder to be filled through the respective hopper, the other ball check valve is open for extrusion of food product from that extrusion cylinder into "Y" coupling 56. Valves 72A and 72B prevent backflow of food product and allow elements 22A and 22B to alternately act as the source of food product for "Y" coupling 56. In one embodiment, elements 22A and 22B operate cyclically.

FIG. 5 is an end elevation view of extrusion head 26, shield 62, shield actuators 64A and 64B, cutting motor 34, and shaft 30. Motor 34, shaft 30, bend 59, and extrusion head 26 are attached to extrusion head frame 78. Cutting shaft 36 is coupled to cutting blade 32 and cutting motor 34.

FIG. 6 is a side view of extrusion head frame 78, conduit 58, bend 59, motor 34, shaft 36, blade 32, extension/retraction shaft 30, and extrusion head 26. Connector 84 connects shaft 30 to frame 78. Shaft 30 may extend and retract from actuator 28 (shown in FIGS. 1 and 2) thereby causing extrusion head 26 to extend and retract as slidable conduit 58 slides within conduit 57. Extrusion head 26 includes die assembly 26A fixed to bend 59 by fastener 86 which also attaches blade 32 to shaft 36. Die assembly 26A contains a plurality of tapered extrusion channels 88.

Extrusion channels 88 are formed by tapered ridges 92 between first tapered concentric die ring 90A, second tapered concentric die ring 90B, and third tapered concentric die ring 90C, as shown in FIGS. 7 and 8. Die rings 90A, 90B, and 90C have inner and outer circumferences whereby they can be fitted together as shown in FIG. 7, and seated in a tapered inner circumference of die ring housing 98A which fits into extrusion nut 98. The tapers provide spacing for food product extrusion. Extrusion nut 98 is then connected to bend 59. The particular extrusion head shown is for illustrative purposes. Other head configurations for different food products (such as sauce or meat) and different extrusion techniques are within the scope of the invention. The design of assembly allows quick disassembly for ease of cleaning and accepts a multitude of different shapes within die ring housing 98A. Further, assembly of rings 90A, 90B and 90C does not require a specific orientation of the rings in housing 98A. U.S. Pat. No. 5,244,370 issued Sep. 14, 1993 to DeMars shows an example of another extruder and head assembly.

FIG. 8 shows a bottom view of cutting blade 32 attached to shaft 36 in extrusion head 26. All three tapered concentric die rings 90A, 90B, and 90C are shown seated within one another and extrusion nut 98.

When pressure is applied to the food product with piston member 46A or 46B, food product is forced into "Y" coupling 56. As head 26 moves in tandem with receptacle 38 due to extension of shaft 30, valves 72A and 72B are forced closed and food product is extruded through extrusion head 26 in a continuous manner and cut by where cutting blade 32. The cut food product is deposited on receptacle 38.

After depositing is complete, receptacle 38 continues on conveyor assembly 40. Shaft 30 is retracted, refilling conduits 57 and 58 with food product from cylinder 44A or 44B through "Y" coupling 56. As receptacle 38 passes scale 16, scale 16 determines the amount of food product deposited on receptacle 38. Scale 16 is automatically zeroed so that positive weights registered on the scale 16 reflect the amount of food product deposited on receptacle 38 by first depositing mechanism 12.

In FIG. 3, microprocessor 18 connects to scales 15 and 16 and mechanisms 48A and 48B. Microprocessor 18 controls piston members 46A and 46B, the stroke of shaft 30, and thereby the amount of food product extruded from head 26. Microprocessor 18 may be linked to compression cylinders 44A and 44B and hoppers 54A and 54B to measure inventory and control the supply of food product to the hoppers to automate the process. Microprocessor 18 couples to extension/retraction actuator 28, shield actuators 64A and 64B, and cutting motor 34. Real time feedback from actuator 28 is monitored to determine its precise location. This allows for precise control of the amount of food product deposited. This allows microprocessor 18 to monitor and control the entire food deposition process.

In one embodiment, food depositor 10 includes second depositing mechanism 14 which may be any suitable food depositing mechanism. For example, a depositing mechanism similar to depositing mechanism 12 or a depositing mechanism as disclosed in U.S. Pat. No. 5,073,391 to DeMars. Microprocessor 18 monitors the amount of cheese deposited by first depositing mechanism 12. Microprocessor 18 communicates with second depositing mechanism 14 to deposit, if necessary, additional food pieces to reach the predetermined target weight range.

In operation, the amount of food product (for example, cheese) deposited on receptacle 38 (typically a pizza crust) is controlled by depositing mechanisms 12 and 14, scale 16, and microprocessor 18. The amount of cheese deposited on receptacle 38 is such that the total weight of the cheese falls within a preselected target weight range. This target weight range can be less than ±10% of a predetermined target weight based upon three standard deviations. For example, a 40 gram target weight could range from 36 to 44 grams, with a first standard deviation of 1.33 grams.

The predetermined target weight is based on the quantity of food product desired on receptacle 38. The quantity of food product extruded depends on the distance extruder head 26 is moved by actuator 28 (i.e. the bore and stroke). This distance can be preset to correspond to the quantity of food product desired. Whether this quantity was deposited by the first depositor is determined by weighing the receptacle before and after the first deposition. Microprocessor 18 compares this weight to the target weight and conveys this information to second depositing mechanism 14 to correct for any deficiencies. This information is also fed back to first depositing mechanism 12 to adjust the distance traveled by extruder head 26 to "fine tune" the amount deposited on future receptacles to more closely approach the target weight.

Once the first deposit is delivered to receptacle 38, scale 16 determines the weight of the amount of cheese of the first deposit. For example, scale 16 may determine that the first deposit contained precisely 28 grams of cheese. Scale 16 feeds this information to microprocessor 18 which determines the difference in weight between the measured weight of the first amount and the predetermined target weight. This is deferred by comparing the weight measured by scale 16 with that measured by scale 15. If the weight of receptacle 38 is predetermined, this information can be provided to microprocessor 18 for use during calculation of the weight of the deposited food product. In our example 12 grams (i.e., 40 grams–28 grams= 12 grams).

Using this difference, microprocessor 18 actuates second depositing mechanism 14 which delivers a second amount of cheese to receptacle 38 so that the total weight of the first and second amounts of cheese deposited on a pizza crust falls within the preselected target range. In our example, microprocessor 18 would actuate second depositing mechanism 14 to deposit approximately 12 grams of cheese in the second deposit, so that total weight of cheese pieces (i.e, the total weight of the first and second deposits) is within the preselected target weight range (i.e., ±10% of a predetermined target weight of 40 grams). Microprocessor 18 also provides feedback to mechanism 12 to adjust for variations due to temperature, pressure and voids within the food product.

If the measured weight of the first deposit falls within the preselected target weight range, there is no need for microprocessor 18 to actuate the second depositing mechanism 14 to deposit the second amount of cheese pieces. Depositing mechanism 14 may include a scale 100 connected to microprocessor 18. Scale 100 weighs receptacle 38 to provide additional feedback and more accurate control of the deposition process.

Food depositor 10 typically achieves a deposit weight variation less than ±10% from a predetermined target weight through a process which allows the receptacle to be continuously conveyed during both depositions, if two are necessary, and the intermediate weighing process. A typical speed of conveyor 40 is 18.3 meters per minute for 30.5 centimeter diameter pizzas with 10.2 centimeters spacing. (This also means that the maximum stroke of drive mechanism 28 is 15.25 centimeters.) Prior art devices, such as DeMars, use a two step process where the same depositor extrudes both deposits with a weighing step whereby each receptacle must stop. This stopping results in delay and inefficiency. The one step process of Hochandel results in a cheese deposit weight variation of up to ±30% from a target weight due to inconsistencies in the cheese such as air pockets and density differences. Variations greater than ±20% are easily noticeable by customers. These inconsistencies can discourage sales.

Figure 9:
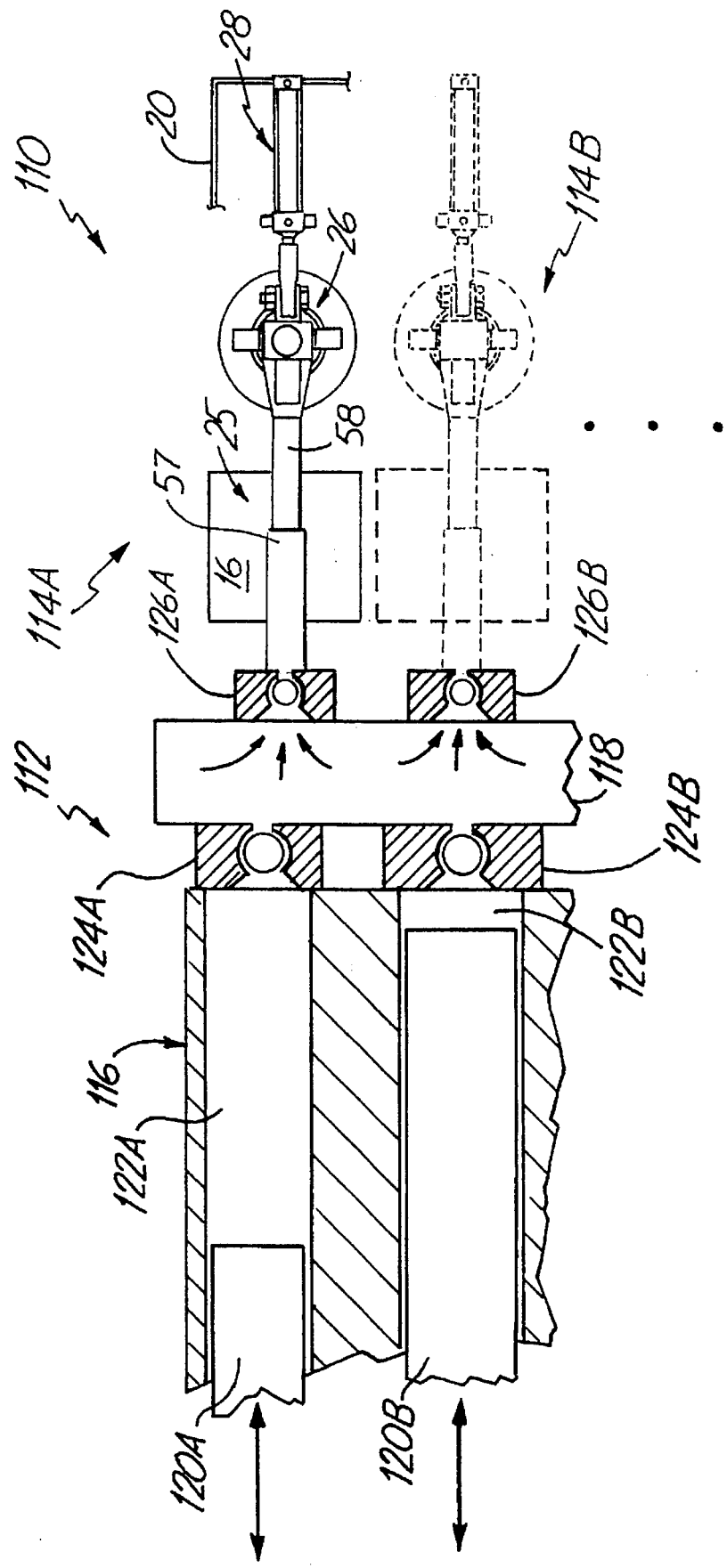
FIG. 9 is a top plan view, with parts removed and broken away, of another food product supply mechanism in accordance with the invention.

FIG. 9 a shows a food product depositor 110 including food supply mechanism 112 in accordance with another embodiment of the invention. Food supply mechanism 112 couples to extrusion head assemblies 114A and 114B which operate and are numbered similarly to those shown in FIGS. 1 and 2. Food supply mechanism 112 includes piston assembly 116 and distribution manifold 118. Piston assembly 116 includes pistons 120A and 120B, and cylinders 122A and 122B. Cylinders 122A and 122B couple to ball check valves 124A and 124B which are connected to distribution manifold 118. Distribution manifold 118 is connected to head units 114A and 114B through ball check valves 126A and 126B, respectively.

Food supply mechanism 112 operates to supply food product to extrusion heads 114A and 114B. In operation, a plurality of pistons 120 force food product through a plurality of cylinders 122 and check valves 124 into distribution manifold 118 which provides a common coupling between extrusion elements 114. Additional pistons and cylinders increase speed and provide redundancy. Arrows in distribution manifold 118 show the flow of food product into ball check valves 126. Food product is supplied to cylinders 122 through hoppers (not shown) and forced into distribution manifold 118 with pistons 120. Valves 124 prevent backflow of food product from trough 118 into cylinders 122. Food product from distribution manifold 118 is forced into conduits 57 and 58 as drive element 28 draws head 26 in a direction opposite the flow of receptacles on conveyor 40. Check valves 126 prevent backflow of food product into distribution manifold 118 as drive element 28 forces head 26 in the direction of the moving receptacles on conveyor 40 causing food product to be extruded from head 26, as previously described.

Typical food products for depositing onto pizza crusts can be selected from the group of cheese, sauce, pepperoni, hamburger, sausage and any deformable solid or viscous fluid. Other food products such as frosting or other toppings can be applied to the appropriate receptacle using the present invention. The food products can be deposited at a temperature up to about 150° F. Further, if a fluid is deposited, its viscosity is typically greater than about 500 cps.

Although the present invention has been described with reference to preferred embodiments, workers skilled in the art will recognize that changes may be made in form and detail without departing from the spirit and scope of the invention. For example, other types of depositors may be used such as pumps, screw feeders or belt feeders.

What is claimed is:

1. An apparatus for depositing a predetermined quantity of food product on a receptacle, comprising:

a conveyor mechanism extending in a lateral direction for moving the receptacle in the lateral direction;

a first depositing device positioned adjacent the conveyor mechanism for depositing a first quantity of food product on the receptacle, the first depositing device comprising:

a depositing head for depositing food product;

a first conduit for carrying food product, the first conduit extending in the lateral direction and in fluid communication with the head;

a second conduit extending in the lateral direction and slidably coupled to the first conduit and in fluid communication with the first conduit;

first means for supplying food product to the second conduit;

means for moving the depositing head in the lateral direction proximate the receptacle while food product is deposited by the head;

a second depositing device positioned adjacent the conveyor mechanism for depositing a second quantity of food product on the receptacle, wherein the conveyor mechanism moves the receptacle in the direction between the first depositing device and the second depositing device;

a scale adjacent the conveyor mechanism positioned between the first depositing device and the second depositing device for weighing the receptacle and determining the weight of food product deposited on the receptacle; and a controller coupled to the scale for controlling deposition of food product in response to weight of food product.

2. The apparatus of claim 1 including a second scale adjacent the conveyor mechanism for weighing the receptacle prior to depositing the first quantity of food product and providing the weight to the controller.

3. The apparatus of claim 1 wherein the controller is coupled to the first depositing device and provides feedback for operation of the first depositing device.

4. The apparatus of claim 3 wherein the controller controls operation of the first depositing device whereby the first quantity of food product deposited on subsequent receptacles is based upon quantities of food product deposited on previous receptacles.

5. The apparatus of claim 1, including:

second means for supplying food product to the second conduit; and a coupling connecting the second conduit to the first and second means for supplying food product.

6. The apparatus of claim 5 wherein the coupling includes a first check valve coupled to the first means for supplying food product and a second check valve coupled to the second means for supplying food product, the first and second check valves preventing back flow of food product from the second conduit by utilizing pressure differential on the check valves.

7. The apparatus of claim 1 wherein food product is selected from the group consisting of cheese, sauce, pepperoni, hamburger and sausage, and wherein the receptacle comprises a pizza crust.

8. The apparatus of claim 1 wherein motion of the depositing head causes deposition of food product from the depositing head.

9. A control system for controlling an amount of food product deposited on a receptacle, comprising:

a conveyor mechanism extending in a lateral direction for moving the receptacle in the lateral direction;

a first depositing mechanism for depositing the food product on the receptacle, including:

first forcing means for forcing food product through a first exit port to deposit food product on the receptacle;

a second depositing mechanism for depositing food product on the receptacle, including:

a depositing head for depositing food product;

a first conduit extending in the lateral direction in fluid communication with the depositing head, the first conduit for carrying the food product;

a second conduit extending in the lateral direction and slidably coupled to the first conduit and in fluid communication with the first conduit;

means for supplying food product to the second conduit;

means for moving the depositing head in the lateral direction proximate the receptacle while the depositing head is depositing food product a scale for supporting the receptacle and determining weight of food product deposited on the receptacle; and a control module coupled to the scale and the first and second depositing mechanisms for controlling the amount of food product deposited by the second depositing mechanism based upon weight information from the scale.

10. The control system of claim 9 wherein the control module further includes a microprocessor for recording an amount of food product deposited by the second depositing mechanism and for controlling an amount of food product deposited by the first depositing mechanism on future receptacles based upon the amounts deposited by the second depositing mechanism, thereby providing feed forward and feed back control.

11. The control system of claim 9 wherein the first depositing mechanism includes a coupling having a first inlet coupled to a first food product source, a second inlet coupled to a second food product source, and an output coupled to the first forcing means.

12. The control system of claim 9 including a second scale for weighing the receptacle prior to depositing food product by the first depositing mechanism and providing weight information to the controller.

13. An apparatus for depositing a food product on a receptacle, the apparatus comprising:

a conveyor mechanism extending in a lateral direction for moving the receptacle in the lateral direction;

a depositing head for depositing food product;

a first conduit extending in the lateral direction in fluid communication with the depositing head, the first conduit for carrying the food product;

a second conduit extending in the lateral direction and slidably coupled to the first conduit and in fluid communication with the first conduit;

first means for supplying food product to the second conduit; and means for moving the depositing head in the lateral direction proximate the receptacle while the depositing head is depositing food product.

14. The apparatus of claim 13, including:

second means for supplying food product to the second conduit; and a valving mechanism coupling the second conduit to the first and second means for supplying food product.

15. The apparatus of claim 14 wherein the valving mechanism includes a first check valve coupled to the first means for supplying food product and a second check valve coupled to the second means for supplying food product, the first and second check valves preventing back flow of food product from the second conduit.

16. The apparatus of claim 13, including:
- a food product depositor spaced apart in the lateral direction from the depositing head;
- a scale positioned between the depositing head and the food product depositor along the conveyor mechanism for weighing the receptacle; and
- a controller coupled to the food product depositor and the scale for controlling the food product depositor in response to weight of the receptacle.

17. The apparatus of claim 16 wherein the controller is coupled to the first means for supplying food product and control of the food depositor is related to a quantity of food product deposited by the depositing head.

18. The apparatus of claim 13 wherein the first means for supplying food product comprises a supply cylinder and a piston slidably received in the supply cylinder.

19. The apparatus of claim 13 wherein motion of the depositing head causes depositing of food product from the depositing head.

20. The apparatus of claim 13 wherein the food product is selected from the group consisting of cheese, sauce, pepperoni, hamburger and sausage, and wherein the receptacle comprises a pizza crust.

* * * * *